US005885719A

United States Patent [19]
Perrin

[11] Patent Number: 5,885,719

[45] Date of Patent: *Mar. 23, 1999

[54] IMPREGNATED SHEET SUBSTANTIALLY FREE OF FORMALDEHYDE USED AS A BASIS FOR A DECORATIVE COATING

[75] Inventor: Claude Perrin, Apprieu, France

[73] Assignee: Arjo Wiggins S.A., Moulineaux, France

[ * ] Notice: This patent issued on a continued prosecution application filed under 37 CFR 1.53(d), and is subject to the twenty year patent term provisions of 35 U.S.C. 154(a)(2).

[21] Appl. No.: 652,482

[22] PCT Filed: Dec. 21, 1993

[86] PCT No.: PCT/FR93/01275

§ 371 Date: Jun. 20, 1996

§ 102(e) Date: Jun. 20, 1996

[87] PCT Pub. No.: WO95/17551

PCT Pub. Date: Jun. 29, 1995

[51] Int. Cl.$^{6}$ .......................... B32B 21/06; B32B 29/00; B05D 3/02

[52] U.S. Cl. .......................... 428/511; 427/384; 427/395; 428/534; 428/535; 428/537.5; 428/542.8

[58] Field of Search .......................... 428/537.5, 542.8, 428/511, 534, 535, 322.2; 427/388.4, 384, 395

[56] References Cited

U.S. PATENT DOCUMENTS

| | | | |
|---|---|---|---|
| 3,355,322 | 11/1967 | Worrall et al. | 428/514 |
| 4,587,141 | 5/1986 | Cooley | 427/377 |
| 5,171,627 | 12/1992 | Brockington et al. | 428/220 |

FOREIGN PATENT DOCUMENTS

| | | |
|---|---|---|
| 1-919385 | 10/1969 | Germany . |
| 09-031890 | 2/1997 | Japan . |

*Primary Examiner*—Hoa T. Le
*Attorney, Agent, or Firm*—Bacon & Thomas, PLLC

[57] ABSTRACT

The invention relates to an impregnated sheet. It is impregnated with a composition containing, as a mixture, a crosslinkable polymer having a glass transition temperature of between −10° and 35° C., used in the form of a stable aqueous dispersion, other than a styrene/ethyl acrylate/butyl acrylate copolymer, and a water-soluble binder. According to the invention, the water-soluble binder is chosen from poly(vinyl alcohol), gelatin, starches, cellulose derivatives, alginates and mixtures thereof. Application to laminated decorative coverings.

16 Claims, No Drawings

IMPREGNATED SHEET SUBSTANTIALLY FREE OF FORMALDEHYDE USED AS A BASIS FOR A DECORATIVE COATING

BACKGROUND OF THE INVENTION

The invention relates to a paper sheet impregnated with a composition in aqueous medium, used as a decorative covering base in the manufacture of decorative panels or profiles. The invention also relates to the impregnation composition and to decorative laminates or profiles containing this sheet.

For many years, decorative panels have been used as materials in dwellings and commercial and industrial buildings. Typical applications of such panels are for covering furniture, table tops, wall surfaces and the like.

Many kinds of decorative panel exist: so-called high-pressure panels, so-called low-pressure panels and panels covered with an adhesive sheet.

The so-called high-pressure panels are produced from a core consisting of sheets, generally made of kraft paper, impregnated with thermosetting resin and more particularly with a phenolic resin.

A decorative sheet is placed over the stack of sheets constituting the core, this decorative sheet generally being a sheet of paper carrying a printed pattern or being colored or containing decorative particles, impregnated with a thermosetting resin which does not turn yellow under heat. In general, a protective covering sheet, known as an "overlay", is placed over the decorative sheet, this overlay having no pattern and being transparent in the final laminate. The stack of impregnated sheets is then placed in a press fitted with a plate which imparts the surface state. The stack is then densified by heating and pressing, so as to obtain a unified structure.

This structure is then attached to a base support; for example it is adhesively bonded to a panel of particles.

So-called low-pressure panels are produced using only a decorative sheet impregnated with thermosetting resin (and optionally an "overlay" sheet) which is laminated directly onto the base support.

The third kind of decorative panel consists of panels composed of a base support, generally a panel of wood particles or agglomerated fibers, and of a sheet of decorative paper impregnated with a composition, attached to the support by means of an adhesive.

The sheet of paper is a decorative sheet of uniform color or one containing decorative patterns. The patterns are generally applied by printing onto the sheet, before or after impregnation. A varnish or a lacquer is also applied, the purpose of which is to protect the surface of the sheet.

These sheets are usually impregnated using a size press or another device for impregnation on a paper machine or away from a paper machine with compositions containing aqueous dispersions based on styrene/ethyl acrylate/butyl acrylate copolymer and an aqueous solution of resins containing formaldehyde, such as melamine/formaldehyde or urea/formaldehyde resins.

The sheets impregnated on-line on the paper machine are said to be preimpregnated and those impregnated off-line are said to be post-impregnated. The invention relates to these two types of impregnated sheet.

A major drawback of these sheets thus impregnated is that they contain formaldehyde which is harmful to the health; the content of this compound is subject to increasingly restrictive legislation.

Another considerable drawback is that their flexibility or ability to be deformed is relatively insufficient, they are fragile to handle and breaks or cracking of the sheet are thus observed when it is applied to a surface which is not flat, that is to say a surface with relief or hollows or one which has ridges.

Moreover, the sheets must have good resistance to peeling, and thus good internal cohesion, in order for them not to become detached from the support on which they are adhesively bonded and also in order for there to be no problems of tearing off or deterioration of these sheets during machining of the panels.

Thus, the sheets must simultaneously be sufficiently flexible and deformable to allow their use as a covering for surfaces which are not flat and to have a high internal cohesion; however, a person skilled in the art knows that it is difficult to obtain these two characteristics simultaneously for a sheet.

The problem to solve is thus one of providing impregnated sheets containing no formaldehyde while at the same time having the characteristics required for its application, in particular a high internal cohesion combined with good deformability.

The sheets must also have good printability and have a good aptitude for lacquering or varnishing.

The French application registered under the number FR 92/07558 describes a composition for impregnating a sheet for decorative covering, which is free of formaldehyde and which contains a styrene/ethyl acrylate/butyl acrylate copolymer and a binder.

SUMMARY OF THE INVENTION

The Applicant has found that the problems are solved using, as impregnation composition, a composition free of formaldehyde and which contains a crosslinkable polymer and has a glass transition temperature of between −10° and 35° C., used in the form of a stable aqueous dispersion, other than a styrene/ethyl acrylate/butyl acrylate copolymer, and a water-soluble binder.

A polymer in the form of microdroplets in stable aqueous dispersion is also referred to as a latex.

The glass transition temperature (written Tg) is preferably between 0° and 20° C.

The lower limit of the Tg is justified in particular by the fact that if the Tg is very low, the composition may pose problems of fouling on the machine.

According to the examples described later, if the Tg is too high (above about 40° C.), the ability of the sheet to be deformed is low.

Thus, the invention provides an impregnated sheet for decorative covering, a feature of which is that it is impregnated with a composition containing, as a mixture, a crosslinkable polymer and having a glass transition temperature of between −10° and 35° C., which is used in the form of a stable aqueous dispersion, other than a styrene/ethyl acrylate/butyl acrylate copolymer, and a water-soluble binder.

The polymer may be self-crosslinkable or crosslinkable by the action of an external agent.

DETAILED DESCRIPTION OF THE INVENTION

More particularly, a feature of the invention is that the crosslinkable polymer used in the form of a stable aqueous dispersion is chosen from styrene/butadiene copolymers, carboxylated styrene/butadiene copolymers, vinyl acetate polymers including poly(ethylene/vinyl acetate), acrylic polymers and derivatives other than a styrene/ethyl acrylate/ butyl acrylate copolymer, urethane polymers and mixtures thereof. The term polymer should be understood to include homopolymer and copolymer.

More particularly, a feature of the invention is that the water-soluble binder is chosen from poly(vinyl alcohol), gelatin, starches, cellulose derivatives, alginates and mixtures thereof. A cellulose derivative which may be used in particular is carboxymethylcellulose.

Preferably, a feature of the sheet according to the invention is that it is impregnated with a composition containing 95 to 50 parts, as dry weight, of crosslinkable polymer and 5 to 50 parts, as dry weight, of water-soluble binder, the sum of the respective parts being equal to 100.

According to a particular case of the invention, the water-soluble binder is a poly(vinyl alcohol) having a degree of hydrolysis of 98–99 and a viscosity of 4 mPa s [determined at 20° C. according to DIN standard 53015 for a 4% solution]). The degree of hydrolysis is expressed, as usual, as a % of moles of acetate hydrolysed.

According to a preferred case of the invention, the sheet is impregnated with a composition containing 70 to 90 parts, as dry weight, of poly(ethylene/vinyl acetate) and 30 to 10 parts, as dry weight, of the poly(vinyl alcohol) defined above, the sum of the respective parts being equal to 100.

The invention also relates to the decorative profiles or laminates containing such a sheet as a decorative sheet.

The invention also relates to the aqueous composition for impregnation of the sheet.

A feature of the impregnation composition for impregnating the sheet which serves as a base for decorative coverings is thus that it contains, as a mixture, a stable aqueous dispersion of a crosslinkable polymer, having a glass transition temperature of between −10° and 35° C., other than a styrene/ethyl acrylate/butyl acrylate copolymer, and a water-soluble binder.

In particular, a feature of the composition is that the water-soluble binder is chosen from poly(vinyl alcohol), gelatin, starches, cellulose derivatives, alginates and mixtures thereof.

In particular a feature of the composition is that the crosslinkable polymer in stable aqueous dispersion is chosen from styrene/butadiene copolymers, carboxylated styrene/butadiene copolymers, vinyl acetate polymers including poly(ethylene/vinyl acetate), acrylic polymers and derivatives other than a styrene/ethyl acrylate/butyl acrylate copolymer, urethane polymers and mixtures thereof.

The composition preferably contains 95 to 50 parts, as dry weight, of crosslinkable polymer, which is used in the form of a stable aqueous dispersion, and 5 to 50 parts, as dry weight, of water-soluble binder, the sum of the respective parts being equal to 100.

The water-soluble binder is preferably a poly(vinyl alcohol) having a degree of hydrolysis of 98–99 and a viscosity of 4 mPa s [determined at 20° C. according to DIN standard 53015 for a 4% solution].

The composition more preferably contains 70 to 90 parts, as dry weight, of poly(ethylene/vinyl acetate) and 30 to 10 parts, as dry weight, of poly(vinyl alcohol), the sum of the respective parts being equal to 100.

The impregnation composition preferably has a Brookfield viscosity of less than 200 mPa s, measured at 100 revolutions per minute, in order for the sheet to be correctly impregnated.

The impregnation composition may also contain formaldehyde-free adjuvants usually used in papermaking, in order to facilitate the impregnation and drying of the sheet, such as wetting agents, coalescence agents, lubricants such as calcium stearate, and insolubilizing agents.

The invention will be better understood with the aid of the following non-limiting examples:

EXAMPLE 1 according to the prior art

A paper sheet is formed by conventional means from a composition of cellulose fibers, a binder and other papermaking adjuvants. The sheet is drained and then dried; the sheet obtained has a weight per unit area of 45 $g/m^2$.

The sheet is printed, on a size press, with a composition containing 80 parts, as dry weight, of a latex of a styrene/ethyl acrylate/butyl acrylate copolymer and 20 parts, as dry weight, of urea/formaldehyde resin, added in the form of an aqueous solution.

The Brookfield viscosity, measured with a rotor rotating at 100 revolutions/minute, is 40 mPa s.

The sheet is dried at about 120° C. A sheet having a weight per unit area of 60 $g/m^2$ is obtained.

The amount of formaldehyde which is released from the sheet is measured according to DIN standard 52368; this value is expressed as mg of formaldehyde released per hour and per square meter of sheet. In this example, the amount of formaldehyde is 1.5.

The internal cohesion of the lacquered sheet is measured in order to estimate its peel strength and its surface bonding strength, by a test of tearing off with an adhesive tape according to the following method: a strip of the sheet cut up beforehand either in the machine direction of the paper or in the crosswise direction is attached to a glass plate using a double-sided adhesive tape. A piece of one-sided adhesive tape (reference TESA 4204 from that company) is pressed onto the strip of paper, one end of the piece of adhesive tape being kept free by applying it to a trestle 80 mm in height. After a period of 7 days, the adhesive tape is torn from the sheet by its free end.

In order to see with the naked eye whether the sample has been torn, the adhesive tape is applied to a black or white background depending on the color of the test piece.

In the case of the example, the tape is checked on a white background.

Confirmation is made that the sheet prints correctly. Confirmation is also made that the sheet has a good aptitude for lacquering; a polyester-based lacquer is used.

The resistance to deformation of the lacquered sheet is tested by a crease strength test described in the article "Wearing quality of experimental currency-type papers", Journal of Research of the National Bureau of Standards, Volume 36, pages 249 to 268, March 1946. The number of creasing actions necessary to observe the first cracking of the lacquer is determined. In this case, the number of creasing actions is 1, which is very low.

EXAMPLE 2 according to the invention

A sheet is prepared as in Example 1, but is impregnated with a composition containing 80 parts, as dry weight, of a self-crosslinkable poly(ethylene/vinyl acetate)—known as EVA—latex whose glass transition temperature Tg is 6° C., and 20 parts, as dry weight, of poly(vinyl alcohol) having a degree of hydrolysis of 98–99 and a viscosity of 4 mPa s [determined at 20° C. according to DIN standard 53015 for a 4% solution], added in the form of an aqueous 10% solution. The solids are adjusted such that the composition has a Brookfield viscosity, measured with a rotor rotating at 100 revolutions/minute, of 80 mPa s.

The sheet thus impregnated is tested as in Example 1. The amount of formaldehyde is less than 0.15mg/(h $m^2$). Its printability and its aptitude to varnishing are as good as those of Example 1.
In this case, the number of creasing actions is 8, which represents a very considerable gain when compared with the sheets according to the prior art.

EXAMPLE 3 according to the invention

A sheet is prepared as in Example 1, but is impregnated with a composition containing 80 parts, as dry weight, of a self-crosslinkable polyacrylic latex with a Tg of 32° C., and 20 parts, as dry weight, of the poly(vinyl alcohol) used in Example 2.

The solids are adjusted such that the composition has a Brookfield viscosity, measured with a rotor rotating at 100 revolutions/minute, of 80 mPa s.

The sheet thus impregnated is tested as in Example 1. The amount of formaldehyde is less than 0.15 mg/(h $m^2$). Its printability and its aptitude to varnishing are as good as those of Example 1.
In this case, the number of creasing actions is 4, which represents a gain which is still considerable when compared with the prior art.

EXAMPLE 4 according to the invention

A sheet is prepared as in Example 1, but is impregnated with a composition containing 80 parts, as dry weight, of a crosslinkable poly(styrene/butadiene/acryate) latex having a Tg of about 16° C., and 20 parts, as dry weight, of the poly(vinyl alcohol) used in Example 2. The solids are adjusted such that the composition has a Brookfield viscosity, measured with a rotor rotating at 100 revolutions/ minute, of 75 mPa s.

The sheet thus impregnated is tested as in Example 1. The amount of formaldehyde is less than 0.15 mg/(h $m^2$). Its printability and its aptitude to varnishing are as good as those of Example 1.
In this case, the number of creasing actions is 8.

EXAMPLE 5

A sheet is prepared as in Example 1, but is impregnated with a composition containing 80 parts, as dry weight, of a latex of a crosslinkable styrene/acrylate copolymer having a Tg of about 50° C., and 20 parts, as dry weight, of the poly(vinyl alcohol) used in Example 2.
The solids are adjusted such that the composition has a Brookfield viscosity, measured with a rotor rotating at 100 revolutions/minute, of 75 mPa s.

The sheet thus impregnated is tested as in Example 1. The amount of formaldehyde is less than 0.15 mg/(h $m^2$). Its printability and its aptitude to varnishing are as good as those of Example 1
However, the number of creasing actions is 2, which is low.

COMMENT

The results of the tearing test are good in all cases.

I claim:

1. A paper sheet having a high internal bonding and a good deformability for use as a decorative sheet applied to a base support by means of an adhesive so as to form a decorative panel or profile, said paper sheet being impregnated with a composition substantially free of formaldehyde and comprising a mixture of a crosslinkable polymer having a glass transition temperature of −10° to 35° C. and a water soluble binder which is selected from the group consisting of poly(vinyl alcohol), gelatin, starches, cellulose derivatives, alginates and mixtures thereof, said polymer being used in the form of a stable aqueous dispersion, and being different from a styrene/ethyl acrylate/butyl acrylate polymer, and said composition containing 95 to 50 parts, as dry weight, of crosslinkable polymer and 5 to 50 parts, as dry weight, of water soluble binder, the sum of the respective parts being equal to 100.

2. The sheet according to claim 1, wherein the crosslinkable polymer used in the form of a stable aqueous dispersion is selected from the group consisting of styrene/butadiene copolymers, carboxylated styrene/butadiene copolymers, vinyl acetate polymers including poly(ethylene/vinyl acetate), acrylic polymers and derivatives other than a styrene/ethyl acrylate/butyl acrylate copolymer, urethane polymers and mixtures thereof.

3. The sheet according to claim 1, wherein the water-soluble binder is a poly(vinyl alcohol) having a degree of hydrolysis of 98–99 and a viscosity of 4 mPa s determined at 20° C. according to DIN standard 53015 for a 4% solution.

4. The sheet according to claim 1, wherein said impregnating composition contains 70 to 90 parts, as dry weight, of poly(ethylene/vinyl acetate) and 30 to 10 parts, as dry weight, of poly(vinyl alcohol), the sum of the respective parts being equal to 100.

5. The sheet according to claim 1, wherein said impregnating composition has a Brookfield viscosity, measured at 100 revolutions/minute, of less than 200 mPa s.

6. A decorative panel or profile comprising a base support coated by a decorative sheet comprising a paper sheet as claimed in claim 1.

7. The decorative profile or laminate according to claim 6, wherein the crosslinkable polymer used in the form of a stable aqueous dispersion is selected from the group consisting of styrene/butadiene copolymers, carboxylated styrene/butadiene copolymers, vinyl acetate polymers including poly(ethylene/vinyl acetate), acrylic polymers and derivatives other than a styrene/ethyl acrylate/butyl acrylate copolymer, urethane polymers and mixtures thereof.

8. The decorative profile or laminate according to claim 6, wherein the water-soluble binder is a poly(vinyl alcohol) having a degree of hydrolysis of 98–99 and a viscosity of 4 mPa s determined at 20° C. according to DIN standard 53015 for a 4% solution.

9. The decorative profile or laminate according to claim 6, wherein said impregnating composition contains 70 to 90 parts, as dry weight, of poly(ethylene/vinyl acetate) and 30 to 10 parts, as dry weight, of poly(vinyl alcohol), the sum of the respective parts being equal to 100.

10. The decorative profile or laminate according to claim 6, wherein said impregnating composition has a Brookfield viscosity, measured at 100 revolutions/minute, of less than 200 mPa s.

11. A method of manufacture of a decorative profile or laminate comprising a decorative paper sheet, said method comprising impregnating a paper sheet with a composition substantially free of formaldehyde and comprising a mixture of a crosslinkable polymer having a glass transition temperature of between −10° and 35° C. and a water-soluble binder which is selected from the group consisting of poly(vinyl alcohol), gelatin, starches, cellulose derivatives, alginates and mixtures thereof, said polymer being used in the form of a stable aqueous dispersion and being different from a styrene/ethyl acrylate/butyl acrylate copolymer, and said composition containing 95 to 50 parts, as dry weight, of cross-linkable polymer and 5 to 50 parts, as dry weight, of water-soluble binder, the sum of the respective parts being equal to 100.

12. The method according to claim 11, wherein the crosslinkable polymer used in the form of a stable aqueous dispersion is selected from the group consisting of styrene/butadiene copolymers, carboxylated styrene/butadiene copolymers, vinyl acetate polymers including poly (ethylene/vinyl acetate), acrylic polymers and derivatives other than a styrene/ethyl acrylate/butyl acrylate copolymer, urethane polymers and mixtures thereof.

13. The method according to claim 11, wherein the water-soluble binder is a poly(vinyl alcohol) having a degree of hydrolysis of 98–99 and a viscosity of 4 mPa s determined at 20° C. according to DIN standard 53015 for a 4% solution.

14. The method according to claim 13, wherein said impregnating composition contains 70 to 90 parts, as dry weight, of poly(ethylene/vinyl acetate) and 30 to 10 parts, as dry weight, of poly(vinyl alcohol), the sum of the respective parts being equal to 100.

15. The method according to claim 11, wherein said impregnating composition has a Brookfield viscosity, measured at 100 revolutions/minute, of less than 200 mPa s.

16. A decorative profile or laminate comprising, as decorative sheet, a paper sheet impregnated with a composition containing a mixture of a crosslinkable polymer having a glass transition temperature of between −10° and 35° C. and a water-soluble binder, said polymer being used in the form of a stable aqueous dispersion and being different from a styrene/ethyl acrylate/butyl acrylate copolymer, and wherein the water-soluble binder is a Poly(vinyl alcohol) having a degree of hydrolysis of 98–99 and a viscosity of 4 mPa s determined at 20° C. according to DIN standard 53015 for a 4% solution.

* * * * *